United States Patent
Abrudan et al.

(10) Patent No.: US 12,146,975 B2
(45) Date of Patent: Nov. 19, 2024

(54) POSITIONING SYSTEM AND METHOD

(71) Applicant: Nokia Technologies Oy, Espoo (FI)

(72) Inventors: Traian Abrudan, Espoo (FI); Holger Claussen, Dublin (IE); Veli-Matti Kolmonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 650 days.

(21) Appl. No.: 17/283,000

(22) PCT Filed: Oct. 9, 2018

(86) PCT No.: PCT/EP2018/077499
§ 371 (c)(1),
(2) Date: Apr. 5, 2021

(87) PCT Pub. No.: WO2020/074070
PCT Pub. Date: Apr. 16, 2020

(65) Prior Publication Data
US 2021/0349176 A1    Nov. 11, 2021

(51) Int. Cl.
*G01S 5/04* (2006.01)
*G01S 5/02* (2010.01)
*H04W 64/00* (2009.01)

(52) U.S. Cl.
CPC ............... *G01S 5/04* (2013.01); *G01S 5/021* (2013.01); *H04W 64/00* (2013.01)

(58) Field of Classification Search
CPC ........... G01S 5/04; G01S 5/021; H04W 64/00
(Continued)

(56) References Cited

U.S. PATENT DOCUMENTS

| 5,045,860 A | 9/1991 | Hodson |
| 6,456,956 B1 | 9/2002 | Xiong |

(Continued)

FOREIGN PATENT DOCUMENTS

| CN | 106793087 A | 5/2017 |
| WO | 01/58195 A1 | 8/2001 |

(Continued)

OTHER PUBLICATIONS

Pages-Zamora et al., "Closed-form Solution for Positioning Based on Angle of Arrival Measurements", The 13th EEE International Symposium on Personal, Indoor and Mobile Radio Communications, Sep. 18, 2002, pp. 1522-1526.

(Continued)

*Primary Examiner* — Mark G. Pannell
(74) *Attorney, Agent, or Firm* — McCarter & English (57) ABSTRACT

This specification relates to estimation of a location of a mobile device using one or more locator devices. In a first aspect, this specification describes an apparatus comprising: means for receiving, from a set of locator devices at known locations, each locator device comprising an antenna array, bearing measurements indicative of one or more bearings from the antenna array of each of the plurality of locator devices to a mobile device; means for estimating a position of the mobile device using the known location of each locator device and the bearing measurements from each locator device; means for determining, for each of the bearing measurements, an error based on the bearing measurement and the estimated position of the mobile device; means for identifying one or more bearing measurements having an error in excess of a threshold; and means for re-estimating the position of the mobile device such that the contribution of the identified one or more bearing measurements to the re-estimated position is reduced.

20 Claims, 7 Drawing Sheets

(58) Field of Classification Search
USPC .................................................... 455/456.1
See application file for complete search history.

(56) References Cited

U.S. PATENT DOCUMENTS

| | | | | |
|---|---|---|---|---|
| 2003/0103004 | A1* | 6/2003 | Arndt | G01S 5/0205 342/465 |
| 2003/0197645 | A1* | 10/2003 | Ninomiya | G01S 5/02 342/464 |
| 2008/0032708 | A1 | 2/2008 | Guvenc et al. | |
| 2012/0290950 | A1* | 11/2012 | Rapaport | H04L 51/52 715/753 |
| 2013/0342391 | A1* | 12/2013 | Hoang | G01S 5/019 342/357.3 |
| 2015/0226577 | A1* | 8/2015 | Le Grand | G01C 25/00 702/94 |
| 2016/0345286 | A1 | 11/2016 | Jamieson et al. | |
| 2018/0252529 | A1* | 9/2018 | Yang | G01C 21/20 |

FOREIGN PATENT DOCUMENTS

| | | | |
|---|---|---|---|
| WO | 2013/179195 | A1 | 12/2013 |
| WO | 2014/087196 | A1 | 6/2014 |
| WO | 2014/087197 | A1 | 6/2014 |
| WO | 2014/087198 | A1 | 6/2014 |
| WO | 2014/087199 | A1 | 6/2014 |
| WO | 2014/107869 | A1 | 7/2014 |
| WO | 2014/108753 | A1 | 7/2014 |
| WO | 2015/013904 | A1 | 2/2015 |
| WO | 2020/074071 | A1 | 4/2020 |

OTHER PUBLICATIONS

Kurras et al., "Direction of Arrival Based Positioning in Three Dimensional Coordinates", WSA 2017; 21th International ITG Workshop on Smart Antennas, Mar. 15-17, 2017, pp. 122-128.

Toloei et al., "State Estimation for Target Tracking Problems with Nonlinear Kalman Filter Algorithms", International Journal of Computer Applications, vol. 98, No. 17, Jul. 2014, pp. 30-36.

Bnilam et al., "Adaptive Probabilistic Model Using Angle of Arrival Estimation for IoT Indoor Localization", Conference: International Conference on Indoor Positioning and Indoor Navigation IPIN2017, Sep. 2017, 7 pages.

Nurminen et al., "3-D Angle-of-Arrival Positioning using Von Mises-Fisher Distribution", arXiv, Sep. 7, 2017, 5 pages.

Ma et al., "An Indoor Localization Method Based on AOA and PDOA Using Virtual Stations in Multipath and NLOS Environments for Passive UHF RFID", IEEE Access, vol. 6, May 21, 2018, pp. 31772-31782.

Akram et al., "GNSS Positioning Accuracy Enhancement Based on Robust Statistical Mm Estimation Theory for Ground Vehicles in Challenging Environments", Applied Sciences, vol. 8, No. 6, May 25, 2018, pp. 1-23.

Ananthasubramaniam et al., "Cooperative Localization Using Angle of Arrival Measurements: Sequential Algorithms and Non-line-of-sight Suppression", arXiv, Jun. 18, 2012, pp. 1-22.

Zhao et al., "An Improved K-NN Algorithm for Localization in Multipath Environments", EURASIP Journal on Wireless Communications and Networking, Article Mno. 208, 2014, pp. 1-10.

Muthukrishnan et al., "Position Estimation from UWB Pseudorange and Angle-of-arrival: a Comparison of Non-linear Regression and Kalman Filtering", Location and Context Awareness, Lecture Notes in Computer Science, vol. 5561, 2009, 18 pages.

Wielandt et al., "Indoor Multipath Assisted Angle of Arrival Localization", Sensors, vol. 17, No. 11, Nov. 2, 2017, pp. 1-29.

Invitation to Pay Additional Fees and Partial Search Report received for corresponding Patent Cooperation Treaty Application No. PCT/EP2018/077499, dated Jul. 2, 2019, 11 pages.

Jativa et al., "NLOS Mitigation Based on TOA for Mobile Subscriber Positioning Systems by Weighting Measures and Geometrical Restrictions", Asia-Pacific Conference on Computer Aided System Engineering, Jul. 14-16, 2015, pp. 325-330.

International Search Report and Written Opinion received for corresponding Patent Cooperation Treaty Application No. PCT/EP2018/077499, dated Oct. 10, 2019, 20 pages.

* cited by examiner

POSITIONING SYSTEM AND METHOD

RELATED APPLICATION

This application is the National Stage of, and therefore claims the benefit of, International Application No. PCT/EP2018/077499, filed on Oct. 9, 2018, the content of which is incorporated herein by reference in its entirety.

FIELD

This specification relates to estimation of a position of a mobile device using one or more locator devices.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY

In a first aspect, this specification describes apparatus comprising: means for receiving, from a set of locator devices at known locations, each locator device comprising an antenna array, bearing measurements indicative of one or more bearings from the antenna array of each of the plurality of locator devices to a mobile device; means for estimating a position of the mobile device using the known location of each locator device and the bearing measurements from each locator device; means for determining, for each of the bearing measurements, an error based on the bearing measurement and the estimated position of the mobile device; means for identifying one or more bearing measurements having an error in excess of a threshold; and means for re-estimating the position of the mobile device such that the contribution of the identified one or more bearing measurements to the re-estimated position is reduced.

Estimating and/or re-estimating the position of the mobile device may comprise determining a weighted estimate of the position of the mobile device, wherein each bearing measurement is associated with a weight.

The apparatus may further comprising means for updating, for each bearing measurement, the weight associated with the bearing measurement based on the determined error for the bearing measurement. Updating the weight for each of the bearing measurements may comprise mapping the determined error to a weight between zero and one using a monotonic function. Reducing the contribution of the bearing measurements from the identified one or more bearing measurements to the re-estimated position may comprise setting the weights of the one or more identified bearing measurements to zero.

Determining the weighted estimate of the position of the mobile device may comprise determining a subset of components of a best linear unbiased estimator of the position. The subset of components of a best linear unbiased estimator of the position may be estimated using:

$$\hat{p}_{WLS} = T \sum_{n=1}^{L} w_n I_3 - T\hat{V}[w_1(\hat{v}_1^T l_1), \ldots, w_L(\hat{v}_L^T l_L)]^T$$

where $T=(\text{trace}\{W\}I_3 - \hat{V}W\hat{V}^T)^{-1}$, $\hat{V}=[\hat{v}_1, \ldots, \hat{v}_L]$, W is a matrix of the weights associated with the bearing measurements, $I_3$ is the identity matrix, $l_n$ is the known location of the locator device that received an nth bearing measurement, and $\hat{v}_n$ is a unit vector pointing from the locator device that received the nth bearing measurement to the mobile device.

The errors may be determined by a difference between the estimated position of the mobile device and a bearing measurement estimated position estimated individually for each of the bearing measurements. The bearing measurement estimated position for each of the bearing measurements may be obtained from an intersection of the bearing for that bearing measurement and a plane containing the estimated location of the mobile device. The plane may be a horizontal plane or a plane perpendicular to the bearing for that bearing measurement.

The apparatus may further comprise means for iterating the following operations until a threshold condition is met: determining, for each of the bearing measurements, an updated error based on the bearing measurement and the re-estimated position of the mobile device; identifying one or more bearing measurements having an error in excess of the threshold; and re-estimating the position of the mobile device such that the contribution of the identified one or more bearing measurements to the re-estimated position is reduced. The threshold condition may comprise one or more of: a threshold number of iterations; convergence of the estimated position; a difference in the determined errors between iterations falling below a threshold value; and/or until a predefined number of bearing measurements having an error in excess of a threshold have been identified.

In a second aspect, this specification describes a method comprising: receiving, from a set of locator devices at known locations, each locator device comprising an antenna array, bearing measurements indicative of one or more bearings from the antenna array of each of the plurality of locator devices to a mobile device; estimating a position of the mobile device using the known location of each locator device and the bearing measurements from each locator device; determining, for each of the bearing measurements, an error based on the bearing measurement and the estimated position of the mobile device; identifying one or more bearing measurements having an error in excess of a threshold; and re-estimating the position of the mobile device such that the contribution of the identified one or more bearing measurements to the re-estimated position is reduced.

Estimating and/or re-estimating the position of the mobile device may comprise determining a weighted estimate of the position of the mobile device, wherein each bearing measurement is associated with a weight.

The method may further comprise updating, for each bearing measurement, the weight associated with the bearing measurement based on the determined error for the bearing measurement.

Updating the weight for each of the plurality of bearing measurements may comprise mapping the determined error to a weight between zero and one using a monotonic function.

Reducing the contribution of the identified one or more bearing measurements to the re-estimated position may comprise setting the weights of the one or more identified bearing measurements to zero.

Determining the weighted estimate of the position of the mobile device may comprise determining a subset of components of a best linear unbiased estimator of the position. The subset of components of a best linear unbiased estimator of the position may be estimated using:

$$\hat{p}_{WLS} = T \sum_{n=1}^{L} w_n I_3 - T\hat{V}[w_1(\hat{v}_1^T l_1), \ldots, w_L(\hat{v}_L^T l_L)]^T$$

where $T=(\text{trace}\{W\}I_3-\hat{V}W\hat{V}^T)^{-1}$, $\hat{V}=[\hat{v}_1, \ldots, \hat{v}_L]$, W is a matrix of the weights associated with the bearing measurements, $I_3$ is the identity matrix, $l_n$, is the known location of the locator device that received an nth measurement and $\hat{v}_n$, is a unit vector pointing from the locator device that received the nth measurement to the mobile device.

The errors may be determined by a difference between the estimated position of the mobile device and a bearing measurement estimated position estimated individually for each of the bearing measurements. The bearing measurement estimated position for each of the bearing measurements received from the locator devices may be obtained from an intersection of the bearing for that bearing measurement and a plane containing the estimated location of the mobile device. The plane may be a horizontal plane or a plane perpendicular to the bearing for that bearing measurement.

The method may further comprise iterating the following operations until a threshold condition is met: determining, for each of the bearing measurements, an updated error based on the bearing measurement and the re-estimated position of the mobile device; identifying one or more bearing measurements having an error in excess of the threshold; and re-estimating the position of the mobile device such that the contribution of identified one or more bearing measurements to the re-estimated position is reduced. The threshold condition may comprise one or more of: a threshold number of iterations; convergence of the estimated position; a difference in the determined errors between iterations falling below a threshold value; and/or until a predefined number of bearing measurements having an error in excess of a threshold have been identified.

In a third aspect, this specification describes apparatus comprising: one or more processors; a memory, wherein the memory includes instructions that, when executed by the one or more processors, causes the apparatus to perform a method comprising: receiving, from a set of locator devices at known locations, each locator device comprising an antenna array, bearing measurements indicative of one or more bearings from the antenna array of each of the plurality of locator devices to a mobile device; estimating a position of the mobile device using the known location of each locator device and the bearing measurements from each locator device; determining, for each of the bearing measurements, an error based on the bearing measurements and the estimated position of the mobile device; identifying one or more bearing measurements having an error in excess of a threshold; and re-estimating the position of the mobile device such that the contribution of the identified one or more bearing measurements to the re-estimated position is reduced.

In a fourth aspect, this specification describes a system comprising: a plurality of locator devices at known locations, each locator device comprising an antenna array; a mobile device; and apparatus comprising: means for receiving, from a set of locator devices at known locations, each locator device comprising an antenna array, bearing measurements indicative of one or more bearings from the antenna array of each of the plurality of locator devices to a mobile device; means for estimating a position of the mobile device using the known location of each locator device and the bearing measurements from each locator device; means for determining, for each of the bearing measurements, an error based on the bearing measurement and the estimated position of the mobile device; means for identifying one or more bearing measurements having an error in excess of a threshold; and means for re-estimating the position of the mobile device such that the contribution of the identified one or more bearing measurements to the re-estimated position is reduced.

In a fifth aspect, this specification describes a non-transitory computer readable medium comprising program instructions for causing an apparatus to perform at least the following: receiving, from a set of locator devices at known locations, each locator device comprising an antenna array, bearing measurements indicative of one or more bearings from the antenna array of each of the plurality of locator devices to a mobile device; estimating a position of the mobile device using the known location of each locator device and the bearing measurements from each locator device; determining, for each of the bearing measurements, an error based on the bearing measurement and the estimated position of the mobile device; identifying one or more bearing measurements having an error in excess of a threshold; and re-estimating the position of the mobile device such that the contribution of the identified one or more bearing measurements to the re-estimated position is reduced.

BRIEF DESCRIPTION OF THE DRAWINGS

Examples will now be described by way of non-limiting example with reference to the accompanying drawings, in which.

DETAILED DESCRIPTION

Various indoor localization technologies have been developed, with different accuracies and costs. For example, camera-based systems provide highly accurate localization, but they are subject to "blind spots", and are usually prohibitively expensive, and hence do not scale well. On the other hand, radio systems relying on existing communication infrastructure are usually very cost-effective solutions, but they only achieve accuracies of few meters. Common indoor radio positioning technologies rely on pairwise range estimates, differential ranges (time difference of arrival), or angle of arrival (AoA). Range estimates are obtained either from received signal strength (RSS) or time-of-arrival, such as in ultra-wideband (UWB) systems, whereas angles of arrival are estimated using antenna arrays. In general, the accuracy of these systems can be increased by adding more nodes, but typically UWB and AoA based systems provide much better accuracies than RSS based systems.

State of the art methods do not consider, or insufficiently deal with, the multipath propagation that may be present in indoor environments. Filtering-based methods attempt to mitigate the multipath problem a posteriori, by relying on the ability of the filter to reject outliers. However, this is not possible when outliers are very frequent, leading to suboptimal filter operation, and hence biased position estimates.

State-of-the-art indoor location detection methods typically exhibit cubic complexity in number of angular measurements because they employ costly matrix inversions or decompositions. In the case of particle filters, the complexity may be even larger because typically hundreds (or even thousands) of particles are required for a reasonable filter operation, especially when performing three dimensional localization. This dramatically decreases the number of users that can be simultaneously tracked by the system.

Figure 1:
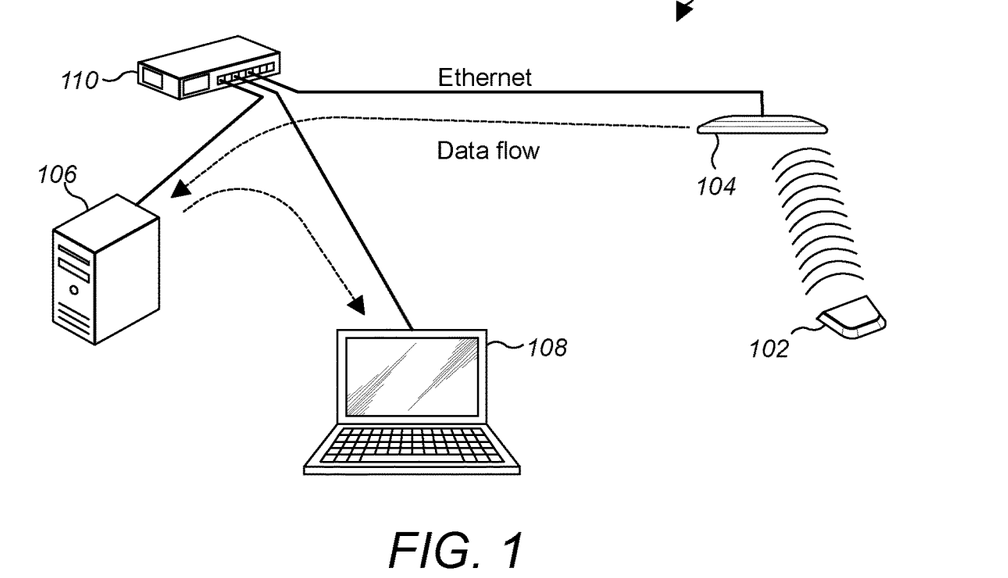
FIG. 1 shows an example of a system for position estimation.

FIG. 1 shows an example of a system for position estimation. The system 100 comprises one or more mobile devices 102 and a plurality of locator devices 104 positioned at a plurality of locations in an environment (only one locator device is shown in FIG. 1 for convenience). The environment may be an indoor environment, such as a building interior, and may also be referred to as a space. In some examples, the system 100 additionally comprises a positioning server 106 for processing data received from the one or more locator devices 104. The system 100 may also optionally comprise a client tool 108 for utilising/monitoring position estimates determined by the system 100 and a Power over Ethernet (PoE) switch 110 for routing signals and power through the system 100.

The one or more mobile devices 102 comprise a mobile communications device capable of transmitting and/or receiving electromagnetic signals. In some examples, the mobile devices 102 comprise one or more mobile radio communications apparatus that is operable to transmit radio signals that are receivable by the locator device 104, for instance Bluetooth Low Energy (BLE) protocol signals. The mobile devices may be, but are not limited to tags (such as BLE tags) low cost Internet-of-Things (IOT) devices, mobile phones (including smart phones), tablet computers, robots drones, or any other device equipped with a transceiver.

Each of the plurality of locator devices 104 comprises an antenna array for receiving and/or transmitting signals. A locator device 104 may be in the form of a base station receiver apparatus. In some examples, the locator devices 104 are positioned on the ceiling of a building (i.e. the overhead interior surface) but in other implementations the locator devices 104 may alternatively or additionally be placed elsewhere, such as on a wall or within an under-floor cavity. The locator devices 104 may also be referred to as positioning devices or positioning receivers. The locator devices 104 are for enabling the position of the mobile device 102 to be estimated, although that is not necessarily the only function provided by the locator devices 104. For example, the locator devices 104 may be part of a transceiver for providing wireless internet access to users of apparatuses, for example, via wireless local area network (WLAN), Bluetooth Low Energy, or cellular radio signals. In the examples described in detail herein, each of the locator devices 104 includes an antenna array via which radio signals may be transmitted and/or received.

Throughout the following description, examples will be described with reference to radio signals. However, it will be appreciated that the systems, apparatus and methods described herein may be applied to any system that performs angular measurements to estimate a position of a mobile device 102. For example, the systems, methods and apparatus described herein may equally be applied to optical systems using visible light or infrared cameras, microphone arrays, and/or hydrophone arrays.

Briefly, the mobile device 102 is configured to transmit signals, such as radio signals for example, which are received at one or more of the locator devices 104 of the system 100. The locator devices 104 are each configured to process the received signals to determine position information indicative of a bearing from the antenna array of the locator device 104 to the mobile device 102 (e.g. an angle-of-arrival, a unit vector pointing from the locator device 104 to the mobile device 102 etc.). In some examples, the signal captured at the locator devices 104 is divided into short packets and the information indicative of a bearing is determined on a per-packet basis. Calculation of the bearing may be performed by the locator devices 104, or externally to the locator devices 104. If bearing calculation is performed externally to the locator devices (e.g. at the positioning server 106), samples or part-processed samples of the received signals may be sent from the locator devices to a positioning server 106.

To estimate a two-dimensional position of a mobile device 102, a single locator device 103 will suffice, provided its three-dimensional position and orientation, as well as the three-dimensional position of the plane containing the mobile device 102 (or some other constraint) is known. For example a user's height can be assumed to be known, hence the height of the horizontal plane containing the mobile device 102 can be estimated, and two-dimensional localization may be performed within this plane. The estimated position will be at the intersection of the estimated direction with the user's plane.

To estimate a three-dimensional position of the mobile device 102 from information indicative of a bearing from the antenna array of the locator device 104 to the mobile device 102 as well as known locator device 104 positions and orientations, at least two locators may be required. The position estimation of the mobile device 102 may then be performed based on multiple angular estimates.

Figure 2:
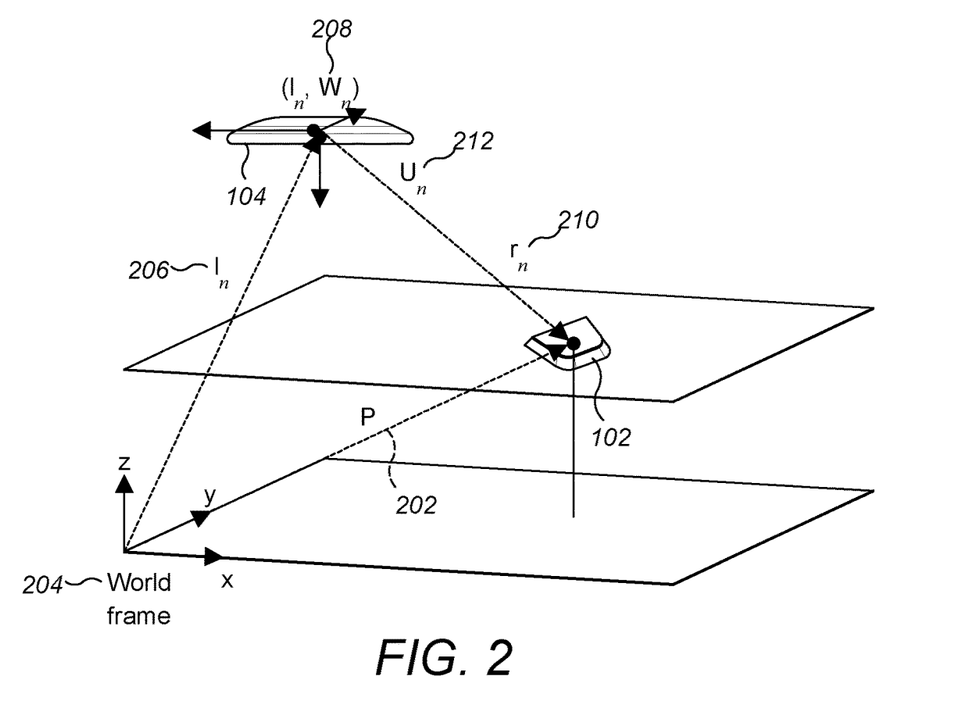
FIG. 2 shows an example of coordinate systems which may be used by the position estimation system.

FIG. 2 shows an example of coordinate systems which may be used by the position estimation system. A position, p, 202 of the mobile device is to be estimated in a particular reference frame, herein referred to as the "world frame" 204. The positions, $l_n$, 206 and orientations, $\Omega_n$, 208 of each of the one or more locator devices 104 (indexed by n) in the world frame are known a priori. The positions 206 of the locator devices may, for example, each be given by a three-dimensional vector. The orientations 208 of the locator devices may, for example, each be given by a three-by-three orthogonal matrix. The position of the mobile device 102 relative to a locator device 104 in that locator device frame is denoted $r_n$ 210, with a unit vector in this direction denoted $u_n$ 212.

For each locator device 104, an equation that relates the true position of the mobile device 102 in the world frame 204 to position in the frame of that locator device is given by:

$$p = l_n + \rho_n \Omega_n u_n, \quad (1)$$

where $u_n$ is a unit vector in the nth locator device 104 frame pointing towards the mobile device 102, and $\rho_n$ is the range (a scalar) between the nth locator device 104 and the mobile device 102. Locator devices do not in general provide range information. The locator devices 104 may, for example, provide an estimate of direction vectors $u_n$ based on estimated angles of arrival. Thus, the range $\rho_n$ is unknown in practice. Note that Eqn. (1) is a linear equation.

Figure 3:
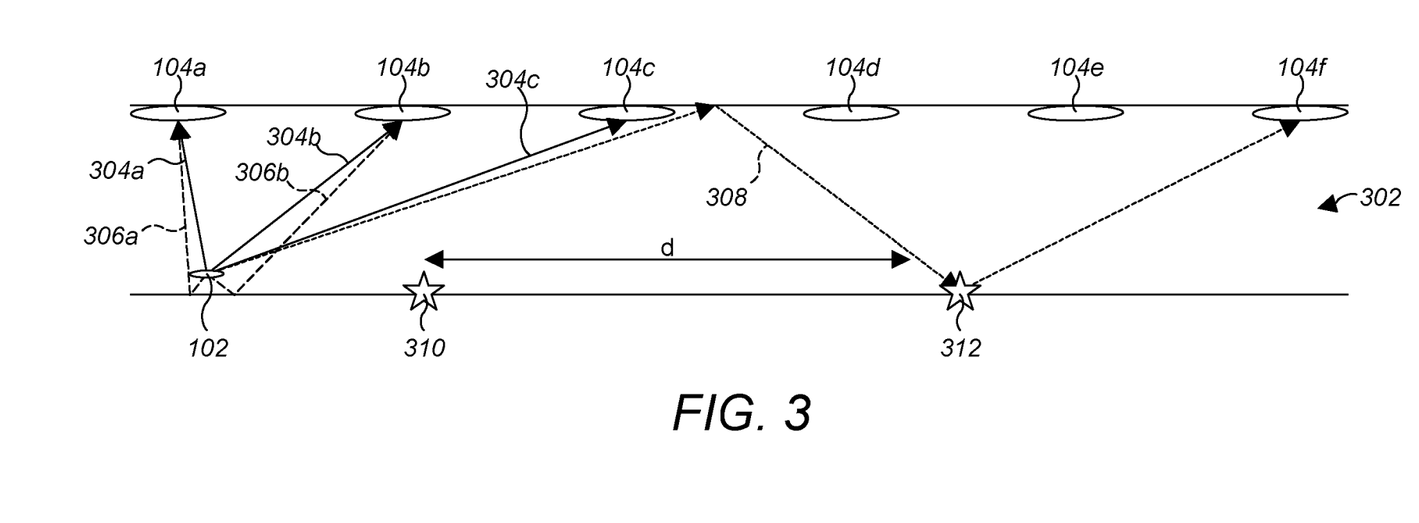
FIG. 3 shows an example of position detection in a space comprising multiple locator devices.
Figure 4:
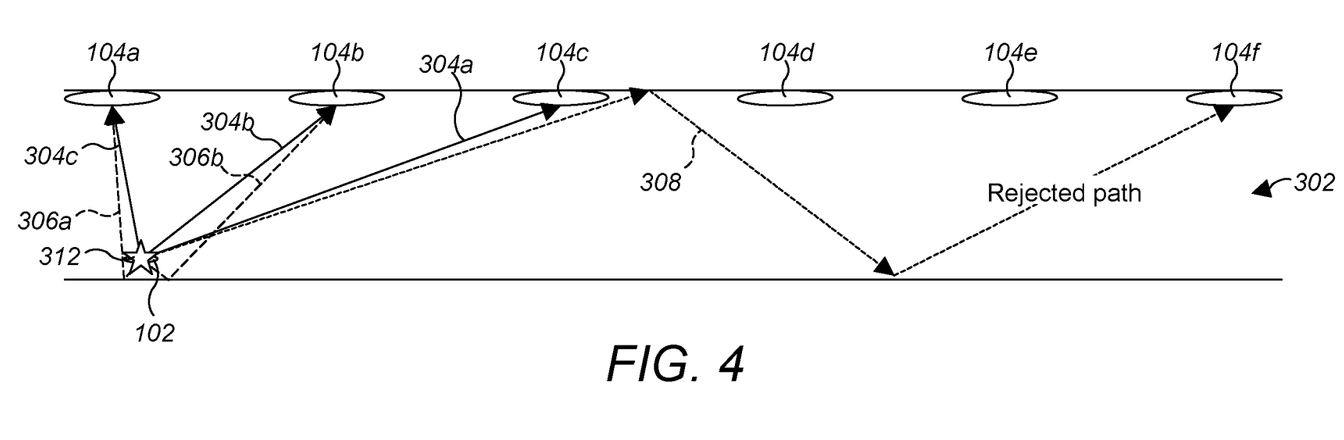
FIG. 4 shows a further example of position detection in a space comprising multiple locator devices.

FIG. 3 and FIG. 4 each show an example of position estimation in an environment/space 302 with multiple locator devices 104a-f. When the mobile device 102 is in the environment 302, signals transmitted from the mobile device 102 (or equivalently, signals received by the mobile device 102 from the locator devices 104a-f) may reach locator devices 104f that are distant from the mobile device 102, even though the viewing cone/coverage area of those locator devices is being exceeded. This may happen as a result of the signals reflecting from surfaces in the space 302 one or more times (so called "multipath propagation"). This can result in erroneous angular estimates at these locator devices 104f, which falsely indicate that the mobile device 102 is located very close to those locator devices 104f.

In the example shown, the environment 302 is a corridor, though in general it can be any indoor environment/space. Signals generated by the mobile device 102 propagate along the corridor, and are received by several of the nearby locator devices 104a-c via direct propagation paths 304a-c. Some of the nearby locator devices 104a-b may also receive the signals via indirect propagation paths 306a-b, in which the signal reflects/bounces off one or more surfaces before reaching the nearby locator devices 104a-b. After a number of reflections (in this example two reflections), the signal also arrives to the distant locator device 104f along propagation path 308.

An initial combined estimated position 310 is computed as a weighted combination of the position information from all the locator devices which detect the signal.

Individual bearing measurement estimated positions 312 may also be determined for each of the locator devices 104 that detect the signal (in the example of FIG. 3, only the estimated position based on position detector 104f is shown). The individual bearing measurement estimated position 312 for a particular locator device is based on the position information for that device. It may further be based on the combined estimated position 310.

The initial combined estimated position 310 is compared to each of individual bearing measurement estimated position 312 to determine an error. For example, the error may be, or may be dependent on, a determined distance d between the initial combined estimate and the individual bearing measurement estimates.

If the error between the initial combined estimated position and the individual bearing measurement estimated positions corresponding to a particular locator device exceeds a predefined value, the angular measurement from that locator device is regarded as outlier. The combined position of the mobile device 102 is then re-estimated such that the influence of outliers on a re-estimated position of the mobile device 102 is reduced. For example, the measurements from locator devices which have been identified as outliers can be discarded, and/or the weight for the locator device can be set to zero. Non-zero weights may be computed for the remaining locator device measurements based on the corresponding errors (e.g. the distance between the initial estimated position and the individual bearing measurement estimated position). Locator devices whose individual bearing measurement estimated position is closer to the initial combined estimated position 310 are weighted higher, whereas locators whose individual bearing measurement estimated positions are farther from the initial combined estimated position 310 are weighted less, and may eventually be removed.

After this rejection procedure, the combined estimated position for the mobile device is recalculated, resulting in a re-estimated position 312. The process may be repeated until a threshold condition is met. For example, once the change in the position estimate is below a pre-set value, the procedure may terminate, and the current re-estimated position is accepted as a solution. This procedure effectively removes the effect of the multipath components in complicated propagation environments and increases the robustness and accuracy of the position estimation.

In some examples, as consequence of both direct and indirect propagation paths, one or more of the locator devices 104 may receive plural instances of the signal, seemingly from different directions (see, for example, locator devices 104a-b in FIGS. 3 and 4). Those locator devices may therefore have multiple sets of position information, each corresponding to a different bearing. In such situations, for the purpose of determining the combined position of the mobile device and determining outliers, each bearing measurement may be treated individually such that a single locator device may be associated with plural individual bearing measurement estimated positions.

Figure 5:
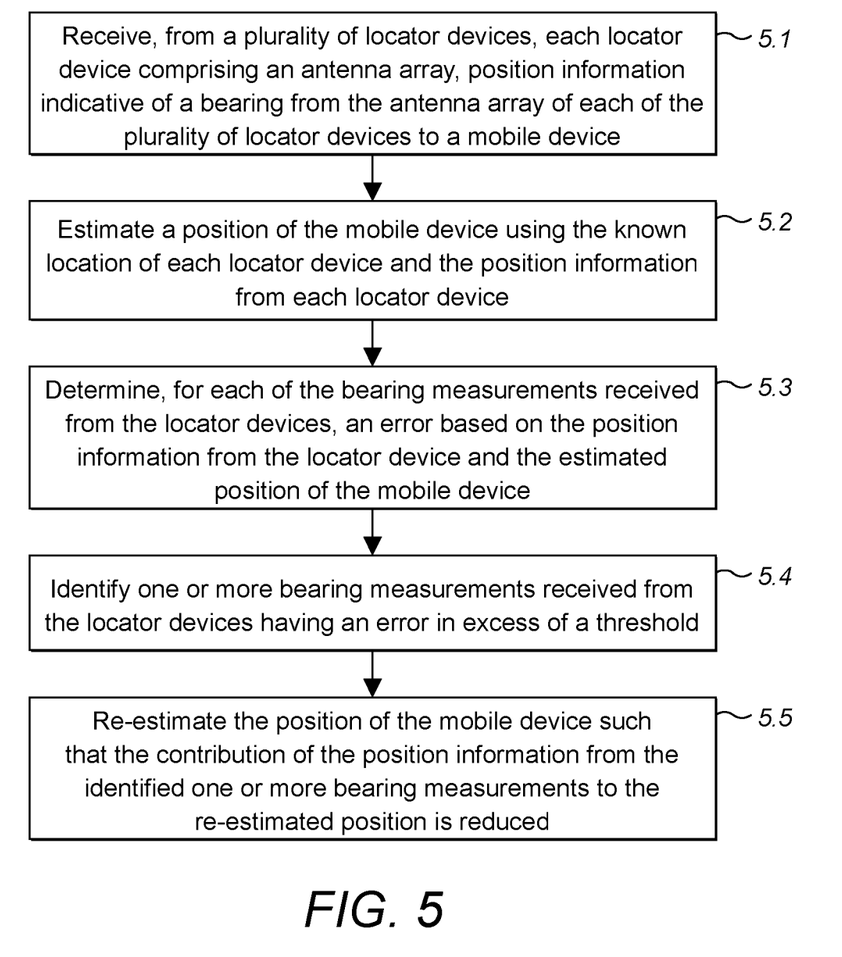
FIG. 5 shows a flow diagram of an example method for determining an estimated position of a mobile device.

FIG. 5 shows a flow diagram of an example method of position estimation. The method may be performed by a positioning server apparatus 106. Alternatively or additionally, it may be performed by one or more locator devices 104.

At operation 5.1, position information indicative of a bearing (e.g. AoA, AoD) from the antenna array of each of the plurality of locator devices 104 to a mobile device 102 is received from the plurality of locator devices 104. The position information comprises bearing measurements indicative of the bearing from the antenna array of each of the plurality of locator devices 104 to a mobile device 102. The bearing measurements may, for example, be an estimate of a unit vector pointing from the locator device 104 to the mobile device 102, $\widehat{u_n}$. In some embodiments, the bearing measurements may comprise angular coordinates relative to a known coordinate axis.

The plurality of locator devices 104 from which position information is received may comprise a subset of the locator devices present in a particular space/environment. For example, the plurality of locator devices 104 from which position information is received may comprise the locator devices 104 which have detected the signal transmitted by the mobile device 102. Locator devices 104 present in the space that do not receive signals from the mobile device 102 may not be considered part of the plurality of locator devices 104. In some examples, the plurality of locator devices from which position information is received may comprise only those locator devices that have detected the transmitted signal having a received signal strength (RSS) in excess of a threshold value. This may serve to exclude the most distant locator devices.

At operation 5.2, the position of the mobile device 102 is estimated using the known position of each locator device 104 and the position information from each locator device 104. A weighted combination of the position information from each of the plurality of locator devices can be used to calculate the combined estimated position, p̂, of the mobile device 102. For example, a weighted least squares method can be used to calculate the combined estimated position of the mobile device 102.

For example, for a plurality of L locator devices 104 (i.e. (n=1, . . . , L)), the position, p, of the mobile device 102, can be written as an over-determined system of L linear equations, whose main unknown is the user's position, p:

$$p - \hat{\rho}_1 \hat{v}_1 = l_1 \quad (2)$$

$$p - \hat{\rho}_L \hat{v}_L = l_L \quad (2)$$

where $\hat{v}_n = \Omega_n \widehat{u_n}$ is the estimated direction vector $\widehat{u_n}$ expressed in the World frame 204. The ranges, $\hat{\rho}_n$, from each of the locator devices 104 to the mobile device 102 are nuisance parameters. This system of linear equation can be recast in matrix form as:

$$H_v \hat{\theta} = \lambda \quad (3)$$

where the matrix $H_v = [1_L \otimes I_3 | \text{blkdiag}\{-\hat{v}_1, \ldots, -\hat{v}_L\}]$, $\theta = [\hat{p}^T, \rho_1, \ldots, \hat{\rho}_L]^T$, $\lambda = [l_1^T, \ldots, l_L^T]^T$, where $1_L$ is an L×1 column vector of ones, ⊗ is the Kronecker product, $I_3$ is the 3×3 identity matrix, and blkdiag{ } operator builds a block-diagonal matrix from its matrix input arguments. The position vector θ contains the three dimensional position of the mobile device 102 and the ranges from each of the plurality of locator devices 104 as redundant parameters, and may be estimated as using a Weighted Least Squares approach. As mentioned above, in some instances, a number N≥L of bearing measurements can be collected from the L locator devices 104, i.e., multiple measurements from one or more of the locator devices 104 (see, for example, locator devices 104a-b in FIGS. 3 and 4). Hence, in general, n denotes the index of a bearing measurement, and $l_n$ denotes the position of the locator device that produced the nth measurement. Each of the N measurements from the L locator devices 104 is associated with a weight, $w_n$, n=1, . . . N, which can collectively be represented in a weight matrix, $\overline{W}$. In terms of this matrix, a best linear unbiased estimator of the position vector, $\hat{\theta}_{WLS}$, can be determined using this weight matrix using:

$$\hat{\theta}_{WLS} = (H_v^T \overline{W} H_v)^{-1} H_v^T \overline{W} \lambda \quad (4)$$

where $$\overline{W} = \text{blkdiag}\{w_1 I_3, \ldots, w_N I_3\} \quad (5)$$

is a diagonal weight matrix describing the reliability of the measurements from each of the plurality of locator devices. From the definition of θ, it can be seen that the first three components of best linear unbiased estimator of the position vector $\hat{\theta}_{WLS}$ give the estimated position, $\hat{p}_{WLS}$, of the mobile device 102. It will be appreciated that the system of linear equations given in Eqn. (2) can be written in many forms that are equivalent to Eqn. (3). Furthermore, the best linear unbiased estimator of the position vector, $\hat{\theta}_{WLS}$, can be constructed in a number of equivalent ways to Eqn. (4). The weight matrix of Eqn. (5) can also be reformulated in a number of ways.

Since the ranges are redundant parameters, in some examples only a subset of components of the best linear unbiased estimator of the position vector is determined. A full solution of Eqn. (4) requires the inversion of a matrix of size (N+3)×(N+3), which would result in cubic complexity in the number of bearing measurements. If instead only a subset of the components of the best linear unbiased estimator of the position vector is determined, the subset corresponding to the components of the estimated position, $\hat{p}_{WLS}$, the block structure of the matrices can be exploited to give a solution for these components that is linear in the number of bearing measurements from the locator devices 104. For example, Eqn. (4) can be reduced to:

$$\hat{p}_{WLS} = T \sum_{n=1}^{L} w_n I_3 - T\hat{V}[w_1(\hat{v}_1^T l_1), \ldots, w_L(\hat{v}_L^T l_L)]^T \quad (6)$$

where $= (\text{trace}\{W\}I_3 - \hat{V}W\hat{V}^T)^{-1}$, $W = \text{diag}\{w_1, \ldots, w_N\}$, $\hat{V} = [\hat{v}_1, \ldots, \hat{v}_L]$, and $\hat{v}_n = \Omega_n \widehat{u_n}$, n=1, . . . , N, and operator diag{ } constructs a diagonal matrix with its scalar arguments along the main diagonal. As Eqn. (6) is linear in the number of bearing measurements from the locator devices 104, a substantial complexity reduction can be achieved, enabling, for example, simultaneous tracking of many more mobile devices 102 given the same computational power.

At operation 5.3, an error is determined for each of the bearing measurements received from the plurality of locator devices 104. The error for each bearing measurement at a locator device is determined based on the position information for the locator device and the combined estimated position, $\hat{p}_{WLS}$, of the mobile device 102.

An individual bearing measurement estimated position, $\hat{p}_n$, may be determined for each set of bearing measurements and compared to the combined estimated position $\hat{p}_{WLS}$, using a metric, which may represent the error. An example of such a metric is the absolute difference metric:

$$d_n = \|\hat{p}_{WLS} - \widehat{p_n}\| \quad (7)$$

where $d_n$ is the distance between the combined estimated position of the mobile device and the individual bearing measurement estimated position of the mobile device using the nth set of bearing measurements only. However, other metrics and/or measures of error may alternatively be used.

The individual bearing measurement estimated position of the mobile device 102, $\hat{p}_n$, for each bearing measurement from a locator device 104 can, for example, be determined from an intersection of the bearing, $\hat{v}_n$, for that locator device 104 to the mobile device 102 and a plane containing the estimated position, $\hat{p}_{WLS}$, of the mobile device 102. In two-dimensional localisation, the plane may be a horizontal plane, for example at the estimated height of the mobile device 102. In three-dimensional localisation, the plane may be a plane perpendicular to $\hat{v}_n$ that crosses the point $\hat{p}_{WLS}$.

At operation 5.4, bearing measurements having an error in excess of a threshold are identified. The threshold may, for example, be a pre-defined distance.

At operation 5.5, the combined position of the mobile device 102, $\hat{p}_{WLS}$, is re-estimated such that the contribution of the position information from the identified one or more bearing measurements to the re-estimated position is reduced. In effect, the outlier bearing measurements have their influence on the combined estimated position reduced or eliminated.

For example, in some examples, the position information indicative of a bearing from the antenna of the identified one or more locator devices 104 to the mobile device 102 is discarded, and the combined estimated position recalculated using Eqn. (6) with only the values from the remaining bearing measurements used (i.e. the bearing measurements whose errors were determined to be below the threshold).

In some examples, one or more of the weights associated with one or more of the bearing measurements can be updated based on the determined error for those bearing measurements. For example, the weight of each of the identified one or more locator devices 104 that has an error that exceeds the threshold can be set to zero. Alternatively or additionally, the weights are recomputed based on the determined errors. For example, the weights may be recomputed using $$w_n = f_d(d_n), \quad (8)$$

where $f_d(x)$ is a monotonic function that maps the errors to numbers between 1 and 0. If the residual error $d_n$ exceeds a predefined maximum value, the corresponding weight will be zero. Otherwise the weight is computed according to some weighting function, such as $f_d(x)$. Examples include, but are not limited to, an Andrew's sine wave or a Huber loss.

The combined position can then be re-estimated using Eqn. (6) with updated weights in the weight matrix.

Operations 5.3 to 5.4 may be iterated until a stopping criterion/threshold is met. Examples of such threshold conditions include, but are not limited to: a threshold number of iterations; convergence of the combined estimated position; a difference in the determined errors between iterations falling below a threshold value; and/or until a predefined number of bearing measurements having an error in excess of a threshold have been identified. One or more of these criteria may be used as a threshold condition, in combination and/or individually.

The re-estimated position determined by the method can be output as an estimate of the position of the mobile device 102. The re-estimated position may be used directly in an application or process. Alternatively, it may undergo further processing to determine a refined estimated position of the mobile device 102.

For example, further position filtering can be performed using a uniform-linear motion model. The filter input measurement is the multipath-resilient solution (i.e. the re-estimated position of the mobile device 102), thus avoiding most outliers. Consequently, the complexity of the position tracking including the Kalman filter remains linear in number of measurements, unlike existing methods, whose complexity is cubic. The tremendous complexity reduction enables scalable and reliable position tracking, since no model linearization or other approximations are required.

Figure 6:
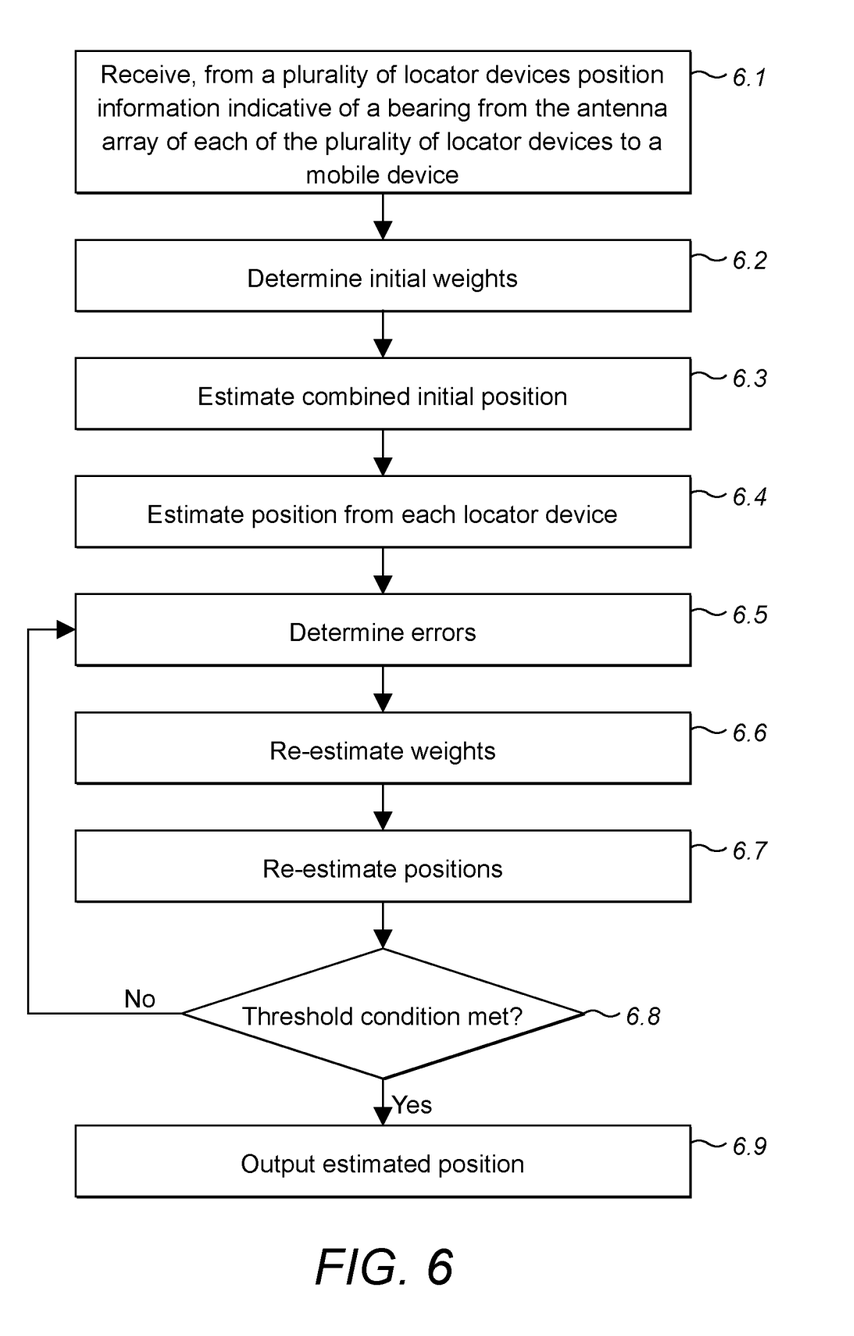
FIG. 6 shows a flow diagram of a further example method for determining an estimated position of a mobile device.

FIG. 6 shows a flow diagram of a further example of a method of position estimation.

At operation 6.1, position information indicative of a bearing from the antenna array of each of the plurality of locator devices 104 to a mobile device 102 is received from the plurality of locator devices 104, for example in the same way as in operation 5.1 in FIG. 5. The position information indicative of the bearing from the antenna array of each of the plurality of locator devices 104 to a mobile device 102 may, for example, be an estimate of a unit vector pointing from the locator device 104 to the mobile device 102, $\widehat{u_n}$.

At operation 6.2, initial weights for each of the bearing measurements from the plurality of locator devices 104 are determined. The initial weights may, for example, all be set to the same pre-determined number, such as 1. Alternatively, the weights may set based on a reliability of the angular/directional estimates of direction of the mobile device 102 from each of the locators. For example, bearing measurements whose estimated direction vector, $\widehat{u_n}$, has a high reliability can be given a higher weight than those whose estimate has a lower reliability. Alternatively or additionally, the initial weights may be based on the RSS of the signal received from the mobile device 102. For example, bearing measurements having a lower RSS may be weighted lower than bearing measurements having a higher RSS.

At operation 6.3, an initial combined position of the mobile device 102 is estimated. The initial combined estimated position can be estimated using a weighted combination of the position information received from the plurality of locator devices 104. In some examples, a weighted least squares estimate is used to provide the estimated position, $\hat{p}_{WLS}$. For example, Eqns. (4)-(6) can be used to estimate the initial position, as described above in relation to operation 5.2 of FIG. 5.

At operation 6.4, an individual bearing measurement estimated position of the mobile device 102 is estimated for each of the bearing measurements from the locator devices 104 based on the combined estimated position and the position information associated with that locator device. The individual estimated position, $\hat{p}_n$, for each bearing measurement can, for example, be determined from an intersection of the bearing, $\hat{v}_n$, for that locator device 104 to the mobile device 102 and a plane containing the estimated position, $\hat{p}_{WLS}$, of the mobile device 102. In two-dimensional localisation, the plane may be a horizontal plane, for example at the estimated height of the mobile device 102. In three-dimensional localisation, the plane may be a plane perpendicular to $\hat{v}_n$ that crosses the point $\hat{p}_{WLS}$.

At operation 6.5, an error is determined for each of the bearing measurements received from the locator devices 104 used in determining the combined estimated position for the current iteration. The error may be determined in the same way as described in relation to operation 5.3. For example, Eqn. (7) can be used to estimate the error.

At operation 6.6, the weights for each of the bearing measurements 104 are re-determined based on the determined error for that locator device. Bearing measurements having an error above a threshold value may be identified and their associated weights set to zero. The measurements of these identified bearing measurements may alternatively or additionally be discarded.

The remaining weights may be updated, for example using Eqn. (8), such that bearing measurements having a low error are assigned higher weights than locator devices 104 with a high error. In updating the weights, the accuracy of each locator device/bearing measurement may also be taken into account.

However, in some examples, the remaining bearing measurement weights are not updated.

At operation 6.7, the combined estimated position is re-estimated using the re-determined weights. For example, Eqn. (6) can be used to re-estimate the combined position using a new weight matrix comprising the updated weights. If bearing measurements have been discarded, the matrices in Eqn. (6) will be smaller than the equivalent matrices in the previous iteration.

At operation 6.8, one or more threshold conditions are checked. If the threshold condition is not satisfied the method returns to operation 6.5 and another iteration of operations 6.5 to 6.8 is performed. Operations 6.5 to 6.8 are iterated until the one or more threshold conditions are met. The threshold condition may comprise one or more of: a threshold number of iterations; convergence of the combined estimated position; a difference in the determined errors between iterations falling below a threshold value; and/or until a predefined number of bearing measurements having an error in excess of a threshold have been identified, either in combination or individually.

If the threshold condition is met, then the iterations terminate, and the re-estimated combined position is output at operation 6.9. The re-estimated combined position may be output for use by an application that requires position data. The re-estimated combined position may undergo further processing to refine the position estimate of the mobile device.

Figure 7A:
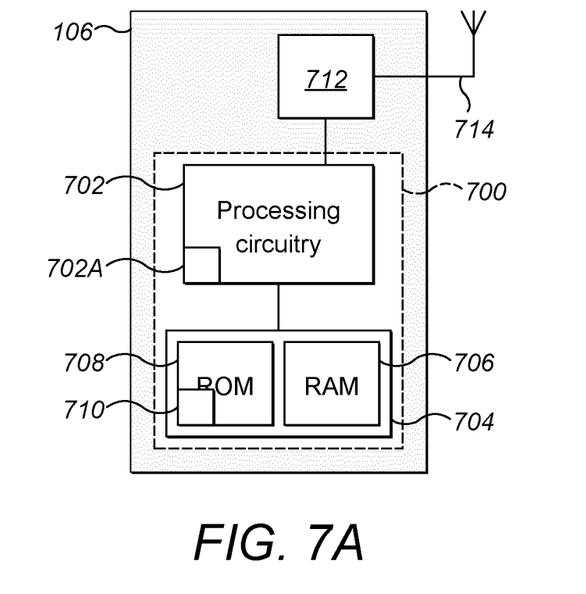
FIG. 7A shows an example configuration of a positioning server apparatus comprising a processing apparatus and memory.

FIG. 7A shows an example of a positioning server apparatus 106. The positioning server apparatus 106 may comprise control apparatus 700 (described in more detail below).

The positioning server apparatus 106 may further comprise communication means 712 for communicating with the one or more locator devices 104. Such communication means 712 may comprise a wired connection with one or more of the locator devices, such as an Ethernet connection, and/or wireless communication means, for example via an antenna 714.

Figure 7B:
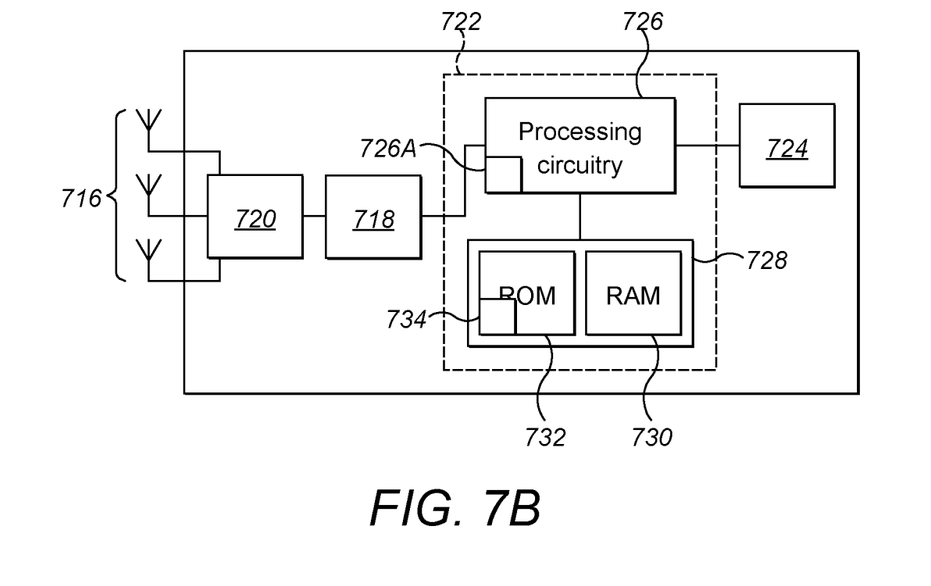
FIG. 7B shows an example configuration of a locator device.

FIG. 7B shows an example of a locator device 104. The locator devices 104 may be high-accuracy locator devices 104 which are configured to derive information or data from receipt of a certain type of packet (known as a positioning packet) which enables a bearing from the mobile device 102 to the locator device 104 to be determined. The high-accuracy locator devices 104 may include a phased array of antennas 702. The antennas of the array 716 are connected to transceiver circuitry 718 via a switch mechanism 720 which is configured to connect only one of the antennas to the transceiver circuitry 716 at any one time. The bearing to the mobile device 102 is determinable based on data derived from the receipt of a specific data portion of the positioning packet as the switch mechanism 720 sequentially connects a different one of the antennas to the transceiver circuitry 718. The data derived from the receipt of the data packet may, in some specific examples, include I and Q data. The locator device 104 further includes a controller 722 for controlling the other components of the device 104 in the manner discussed above and for providing various functionalities as discussed below. For instance, the controller 722 may cause data, derived from receipt of data packets from the mobile device 102, to be provided to the positioning server 106. The data is provided to the positioning server apparatus 106 via an I/O interface 724 which may be configured to transfer data using any suitable wired or wireless protocol.

The high-accuracy locator devices 106 may be referred to as HAIP (high accuracy indoor positioning) locator devices. HAIP as developed by Nokia is known in the art. Indeed, it is mentioned, and is described in various levels of detail, in (among other publications) the following published PCT patent applications, the contents of which are incorporated herein by reference in their entirety: WO 2014087196A, WO2013179195A, WO2014087198A, WO 2015013904A, WO 2014107869A, WO2014108753A, WO2014087199A and WO 2014087197A. In view of these and other disclosures, the fundamental principles utilised by the mobile device 102, locator devices 104 and the positioning server apparatus 106 to provide high accuracy positioning are not described in further detail in this specification.

Figure 7C:
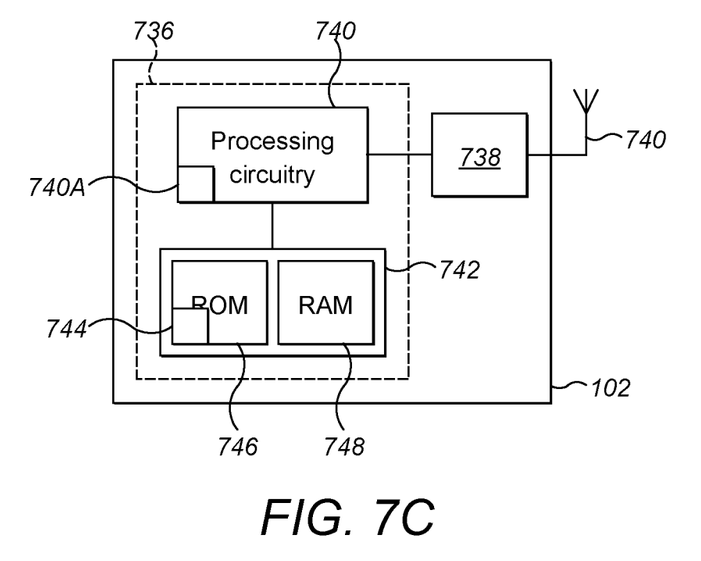
FIG. 7C shows an example configuration of a trackable device.

FIG. 7C shows an example of a mobile/trackable device 102. The one or more mobile devices 102 may be electronic tags or a more complex device such as a personal computing/communications device (such as, but not limited to, a mobile phone, a tablet computer or a wearable computing device such as a smart watch). The one or more mobile devices 102 may be of various different types, with some or all of the devices 102 providing the functionality described herein. The mobile/trackable device 102 comprises at least a controller 736 and transceiver circuitry 738. The controller 736 is configured to provide the functionality discussed herein and also to control the operation of transceiver circuitry 738 to transmit and receive packets via an antenna 740. The mobile devices 102 may be associated with an asset (e.g. carried by a user or attached to an object).

The mobile devices 102, the locator devices 104 and the positioning server apparatus 106 may be configured to communicate using any suitable wireless transmission protocol. In some specific examples, however, the transceivers 712, 718, 738 of the devices/apparatus 102, 104, 106 may each be configured, under the control of respective controllers 700, 722, 736 to communicate via a Bluetooth transmission protocol. For instance, the transceivers 712, 718, 738 may be configured to transmit and/or receive data packets (including data packets for enabling position determination and timing control packets) using a Bluetooth Low Energy protocol, as described in or compatible with the current version of the Core Bluetooth specification (Version 5.0). In other examples, however, at least some of the devices 102, 104, 106 may also or additionally be configured to communicate using another suitable protocol. Such protocols may include but are not limited to 802.11 wireless local area network protocols, other types of Bluetooth protocol or IEEE 802.15.4 protocols.

As will be appreciated, apparatuses illustratively depicted in FIGS. 7A-C may comprise further components which may or may not be directly involved with processes and operations in respect of which this application is focused.

Some further details of components and features of the above-described apparatus 102, 104, 106 and alternatives for them will now be described.

The control apparatus 700, 722, 736 described above may comprise processing apparatus 702, 726, 740 communicatively coupled with memory 704, 728, 742. The memory 704, 728, 742 has computer readable instructions 710, 734, 744 stored thereon which, when executed by the processing apparatus 702, 726, 740 causes the control apparatus 700, 722, 736 to cause performance of various ones of the operations described with reference to FIGS. 1 to 6. The control apparatus 700, 722, 736 may, in some instances, be referred to as simply "apparatus".

The processing apparatus 702, 726, 740 may be of any suitable composition and may include one or more processors 702A, 726A, 740A of any suitable type or suitable combination of types. Indeed, the term "processing apparatus" should be understood to encompass computers having differing architectures such as single/multi-processor architectures and sequencers/parallel architectures. For example, the processing apparatus 702, 726, 740 may be a programmable processor that interprets computer program instructions 710, 734, 744 and processes data. The processing apparatus 702, 726, 740 may include plural programmable processors. Alternatively, the processing apparatus 702, 726, 740 may be, for example, programmable hardware with embedded firmware. The processing apparatus 702, 726, 740 may alternatively or additionally include one or more specialised circuit such as field programmable gate arrays FPGA, Application Specific Integrated Circuits (ASICs), signal processing devices etc. In some instances, processing apparatus 702, 726, 740 may be referred to as computing apparatus or processing means.

The processing apparatus 702, 726, 740 is coupled to the memory 704, 728, 742 and is operable to read/write data to/from the memory 704, 728, 742. The memory 704, 728, 742 may comprise a single memory unit or a plurality of memory units, upon which the computer readable instructions (or code) 710, 734, 744 is stored. For example, the memory 704, 728, 742 may comprise both volatile memory 706, 730, 748 and non-volatile memory 708, 734, 746. In such examples, the computer readable instructions/program code 710, 734, 744 may be stored in the non-volatile memory 708, 734, 746 and may be executed by the processing apparatus 702, 726, 740 using the volatile memory 706, 730, 748 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 704, 728, 742 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 8:
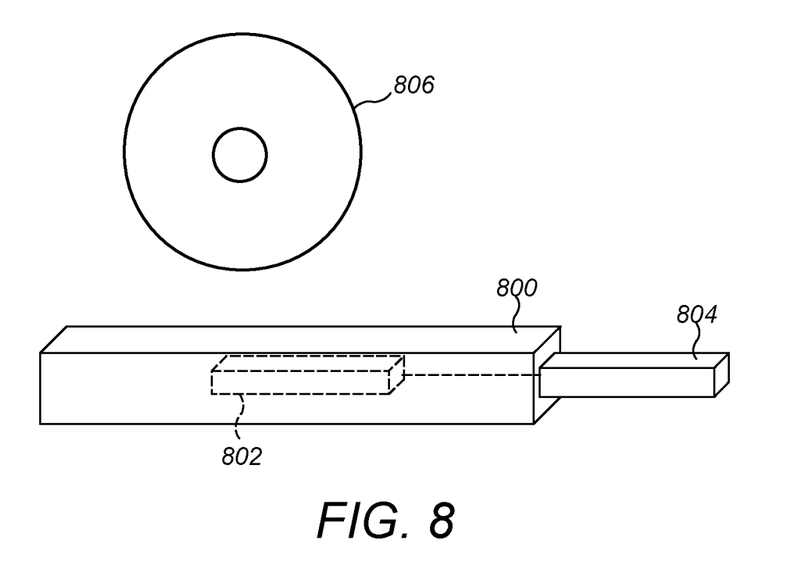
FIG. 8 shows examples of computer readable media.

The computer readable instructions/program code 710, 734, 744 may be pre-programmed into the control apparatus 700, 722, 736. Alternatively, the computer readable instructions 710, 734, 744 may arrive at the control apparatus 700, 722, 736 via an electromagnetic carrier signal or may be copied from a physical entity such as a computer program product, a memory device or a record medium such as a CD-ROM or DVD. An example of a computer program product is illustrated in FIG. 8, and described below. The computer readable instructions 710, 734, 744 may provide the logic and routines that enables the apparatus 102, 104, 106 to perform the functionality described herein. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

The control apparatus 700, 722, 736 may, in some example implementations, be referred to as control circuitry. As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a based station, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 8 shows examples of computer readable media/computer program products 800, 806. In some examples, the computer readable medium 800 is in the form of a portable memory device (such as a "memory stick"). In some examples, the computer readable medium comprises a computer readable disk 806, such as a CD-ROM or DVD. Many other examples are possible. The computer program product 800 comprises a memory 802 containing computer readable instructions that may provide the logic and routines that enables a computing apparatus to perform the functionality described herein. It may also comprise an interface 804, such as a USB interface for example, for communicating with the computing apparatus.

Although various aspects of the methods and apparatuses described herein are set out in the independent claims, other aspects may comprise other combinations of features from the described examples and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims. The extent of protection is defined by the following claims, with due account being taken of any element which is equivalent to an element specified in the claims.

The invention claimed is:

1. An apparatus comprising:
at least one processor and
at least one memory storing instructions that, when executed by the at least one processor, cause the apparatus at least to:
receive, from a plurality of locator devices at known locations, wherein locator devices from the plurality of locator devices are configured to obtain one or more bearing measurements, bearing measurements indicative of one or more bearings from respective ones of the plurality of locator devices to a mobile device;
estimate a position of the mobile device using the known location of the respective ones of the plurality of locator devices and the bearing measurements: from the respective ones of the plurality of locator devices;
determine, for respective ones of the bearing measurements, an error based on the bearing measurement and the estimated position of the mobile device;
determine a weight for respective ones of the bearing measurements based, at least partially, on a mapping of the determined error to a weight between zero and one;
identify one or more bearing measurements having an error in excess of a threshold; and
re-estimate the position of the mobile device such that a contribution of the identified one or more bearing measurements to the re-estimated position is reduced, wherein the bearing measurements are respectively associated with the respective determined weight for the re-estimation.

2. The apparatus of claim 1, wherein estimating the position of the mobile device comprises the at least one memory storing instructions that, when executed by the at least one processor, cause the apparatus to:
determine a weighted estimate of the position of the mobile device, wherein the bearing measurements are respectively associated with a weight.

3. The apparatus of claim 2, wherein determining the weighted estimate of the position of the mobile device comprises the at least one memory storing instructions that, when executed by the at least one processor, cause the apparatus to:
determine a subset of components of a best linear unbiased estimator of the position.

4. The apparatus of claim 3, wherein the subset of components of the best linear unbiased estimator of the position are estimated using:

$$\hat{p}_{WLS} = T \sum_{n=1}^{L} w_n l_3 - T\hat{V}[w_1(\hat{v}_1^T l_1), \ldots , w_L(\hat{v}_L^T l_L)]^T$$

where $T=(\text{trace}\{W\}I_3-\hat{V}W\hat{V}^T)^{-1}$, $\hat{V}=[\bar{v}_1, \ldots, \hat{v}_l]$, W is a matrix of the weights associated with the bearing measurements, $I_3$ is the identity matrix, $l_n$ is the known location of the locator device that received an nth bearing measurement, and $\hat{v}_n$ is a unit vector pointing from the locator device that received the nth bearing measurement to the mobile device.

5. The apparatus of claim 1, wherein the mapping of the determined error to the weight between zero and one comprises using a monotonic function.

6. The apparatus of claim 1, wherein the at least one memory stores instructions that, when executed by the at least one processor, cause the apparatus to:
set the weights of the one or more identified bearing measurements to zero.

7. The apparatus of claim 1, wherein the errors are determined based, at least partially, on a difference between the estimated position of the mobile device and a bearing measurement estimated position estimated individually for the respective ones of the bearing measurements.

8. The apparatus of claim 7, wherein the bearing measurement estimated position for the respective ones of the bearing measurements is obtained from an intersection of a bearing for a bearing measurement and a plane containing the estimated position of the mobile device, wherein the locator devices from the plurality of locator devices respectively comprise at least one antenna.

9. The apparatus of claim 8, wherein the plane is a horizontal plane or a plane perpendicular to the bearing for the bearing measurement.

10. The apparatus of claim 1, wherein the at least one memory stores instructions that, when executed by the at least one processor, cause the apparatus to:
iterate following operations until a threshold condition is met:
determine, for the respective ones of the bearing measurements, an updated error based on the bearing measurement and the re-estimated position of the mobile device;
identify one or more further bearing measurements having an error in excess of the threshold; and
re-estimate the position of the mobile device such that the contribution of the identified one or more further bearing measurements to the re-estimated position is reduced.

11. The apparatus of claim 10, wherein the threshold condition comprises one or more of: a threshold number of iterations; convergence of the estimated position; a difference in the determined errors between iterations falling below a threshold value; or a predefined number of bearing measurements having an error in excess of the threshold have been identified.

12. The apparatus of claim 1, wherein re-estimating the position of the mobile device comprises the at least one memory storing instructions that, when executed by the at least one processor, cause the apparatus to:
assign a weight of zero to at least one of the bearing measurements based, at least a partially, on determination that the error associated with the at least one bearing measurement is above a predefined value.

13. A method comprising:
receiving, from a plurality of locator devices at known locations, wherein locator devices from the plurality of locator devices are configured to obtain one or more bearing measurements, bearing measurements indicative of one or more bearings from respective ones of the plurality of locator devices to a mobile device;
estimating a position of the mobile device using the known location of the respective ones of the plurality of locator devices and the bearing measurements from the respective ones of the plurality of locator devices;
determining, for respective ones of the bearing measurements, an error based on the bearing measurement and the estimated position of the mobile device;
determining a weight for respective ones of the bearing measurements based, at least partially, on a mapping of the determined error to a weight between zero and one;
identifying one or more bearing measurements having an error in excess of a threshold; and
re-estimating the position of the mobile device such that a contribution of the identified one or more bearing measurements to the re-estimated position is reduced, wherein the bearing measurements are respectively associated with the respective determined weight for the re-estimation.

14. The method of claim 13, wherein estimating the position of the mobile device comprises determining a weighted estimate of the position of the mobile device, wherein the bearing measurements are respectively associated with a weight.

15. The method of claim 14, wherein determining the weighted estimate of the position of the mobile device comprises determining a subset of components of a best linear unbiased estimator of the position.

16. The method of claim 13, wherein the mapping of the determined error to the weight between zero and one comprises using a monotonic function.

17. The method of claim 13, further comprising:
setting the weights of the one or more identified bearing measurements to zero.

18. The method of claim 13, wherein the method further comprises iterating following operations until a threshold condition is met:
determining, for the respective ones of the bearing measurements, an updated error based on the bearing measurement and the re-estimated position of the mobile device;

identifying one or more further bearing measurements having an error in excess of the threshold; and re-estimating the position of the mobile device such that the contribution of the identified one or more further bearing measurements to the re-estimated position is reduced.

19. A non-transitory computer readable medium comprising program instructions for causing an apparatus to perform at least the following:

receiving, from a plurality of locator devices at known locations, wherein locator device from the plurality of locator devices are configured to obtain one or more bearing measurements, bearing measurements indicative of one or more bearings from respective ones of the plurality of locator devices to a mobile device;

estimating a position of the mobile device using the known location of the respective ones of the plurality of locator devices and the bearing measurements from the respective ones of the plurality of locator devices;

determining, for respective ones of the bearing measurements, an error based on the bearing measurement and the estimated position of the mobile device;

determining a weight for respective ones of the bearing measurements based, at least partially, on a mapping of the determined error to a weight between zero and one;

identifying one or more bearing measurements having an error in excess of a threshold; and re-estimating the position of the mobile device such that a contribution of the identified one or more bearing measurements to the re-estimated position is reduced, wherein the bearing measurements are respectively associated with the respective determined weight for the re-estimation.

20. The non-transitory computer readable medium of claim 19, wherein the mapping of the determined error to the weight between zero and one comprises using a monotonic function.

\* \* \* \* \*

UNITED STATES PATENT AND TRADEMARK OFFICE
CERTIFICATE OF CORRECTION

PATENT NO. : 12,146,975 B2
APPLICATION NO. : 17/283000
DATED : November 19, 2024
INVENTOR(S) : Traian Abrudan et al.

It is certified that error appears in the above-identified patent and that said Letters Patent is hereby corrected as shown below:

In the Claims

In Claim 34:

Column 17, Line 24, the portion of the formula reading "$\hat{p}_{WLS} = T \sum_{n=1}^{L} w_n l_3 - T\hat{V}[w_1(\hat{v}_1^T l_1), ..., w_L(\hat{v}_L^T l_L)]^T$" should be deleted and -- $\hat{p}_{WLS} = T \sum_{n=1}^{L} w_n l_n - T\hat{V}[w_1(\hat{v}_1^T l_1), ..., w_L(\hat{v}_L^T l_L)]^T$ -- should be inserted.

Column 17, Line 27, "$\hat{V} = [\hat{v}_1, ... , \hat{v}_l]$" should be deleted and -- $\hat{V} = [\hat{v}_1, ... , \hat{v}_L]$, -- should be inserted.

Column 17, Line 27 ",W is a matrix of the weights associated with the bearing measurements" should be deleted and -- , W is a diagonal matrix of the weights associated with the bearing measurements -- should be inserted.

Signed and Sealed this
Seventeenth Day of December, 2024

Derrick Brent
*Acting Director of the United States Patent and Trademark Office*